March 12, 1929. M. F. DE BAJLIGETHY Re. 17,233
DISTILLING APPARATUS
Original Filed July 5, 1924
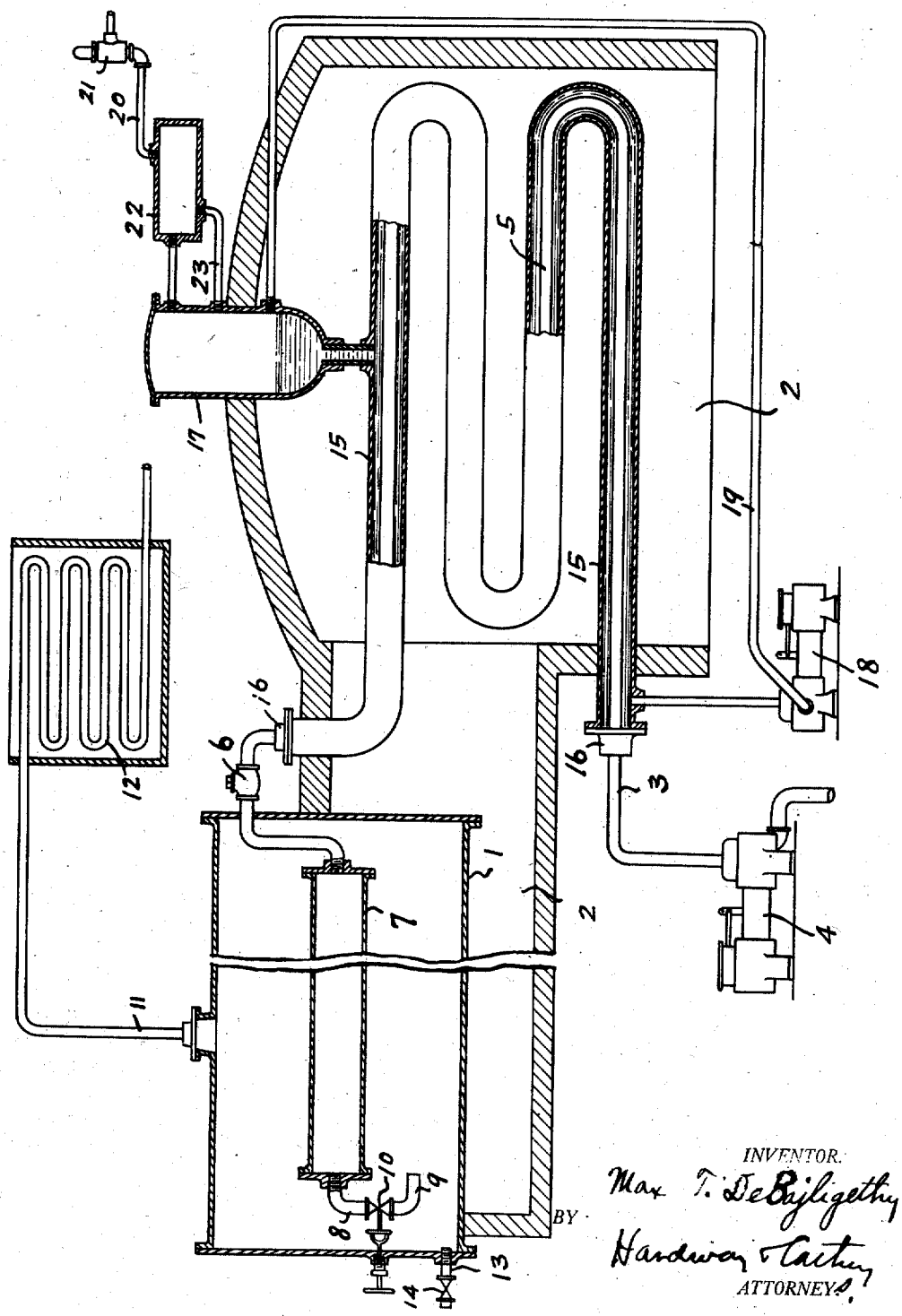
INVENTOR.
Max F. De Bajligethy
BY
Hardway & Cathey
ATTORNEYS.

Reissued Mar. 12, 1929. Re. 17,233

UNITED STATES PATENT OFFICE.

MAX F. DE BAJLIGETHY, OF HOUSTON, TEXAS.

DISTILLING APPARATUS.

Original No. 1,542,864, dated June 23, 1925, Serial No. 724,324, filed July 5, 1924. Application for reissue filed June 21, 1927. Serial No. 203,206.

This invention relates to new and useful improvements in a distilling apparatus.

One object of the invention is to provide an apparatus of the character described which has been specially designed for use in the distillation of hydro-carbon whereby the lighter elements may be separated from the heavier elements thereof and by the use of which the risks of explosion during the distilling process will be greatly lessened.

Another object of the invention is to provide an apparatus of the character described including a drum enclosing a reaction chamber, preferably located wholly within an outer shell or container and through which the hydro-carbon passes under comparatively high pressure, in the process of distillation before it enters said shell or container, said drum being provided for the purpose of relieving the outer shell or container of an excessive amount of pressure and for the further purpose of collecting a portion of certain sediment and other heavy elements to prevent their being deposited on the bottom of the outer shell and there forming a heat retaining coating which in some cases would cause the bottom of the shell to burn out.

A further feature of the invention resides in the provision, in a distilling apparatus, of an outer shell or container for hydro-carbons with a reaction drum therein with means for delivering hydrocarbon oil, at a high temperature and under high pressure into said re-action drum and with means for releasing the oil from the reaction drum into the contents of the shell or container to the end that the evolved vapors, so released, will be constantly discharged through the fluid in the outer shell producing what is commonly known as a bubble effect and resulting in a greater yield of the lighter elements from the fluid in the outer shell than could otherwise be obtained and keeping at least a portion of the carbon in the contents of the shell in a suspended state.

A still further feature of the invention resides in the provision of an inlet line through which the hydro-carbon may be delivered into said reaction drum, said line being formed into a heating coil in a suitable furnace, and being provided with a back pressure valve so that in case the inlet line should become broken beyond said valve the pressure will be retained in the reaction drum and the fluid therein will be prevented from escaping therefrom and said coil being formed double, that is with, an inside or conducting pipe and an outside or circulating pipe which is spaced from the inside pipe and through which a medium such as fused metal may be circulated to keep the outside pipe from becoming too hot, said outside pipe forming a conductor also through which the hydrocarbon in the heater coil may be conducted outside of the furnace in case the inner coil should burst thus preventing the discharge of oil into the furnace, in case of the bursting of the inner coil, and avoiding an explosion.

The invention also comprehends a novel method of distillation, as more specifically hereinafter set out.

With the above and other objects in view the invention has particular relation to certain novel features of construction, operation and arrangement of parts, an example of which is given in this specification and illustrated in the accompanying drawings, wherein:—

The figure shows a vertical sectional view of the apparatus.

In the drawings, the numeral 1 designates the outer shell or container under which the furnace 2 may be extended, if desired. The outer shell or container is filled or partly filled with hydrocarbon through the inlet line 3, which is connected with the pump 4 by means of which the hydrocarbon in the outer shell and line 3 may be kept under pressure. The line 3 is formed into an inner coil 5 in the furnace and incorporated therein adjacent the outer shell there is a valve 6. This valve permits the fluid to readily flow under the influence of the pump through the line 3 but in case the line 3 should become broken or disrupted beyond said valve the valve will close to prevent the discharge of the fluid backwardly through said line. The line 3 enters the outer shell or container 1, preferably near the top thereof and is downwardly turned and enters a reaction drum 7 which is preferably located entirely within said outer shell. Leading from said reaction drum there is an outlet pipe 8 which is preferably turned into parallel relation with the reaction drum 7 and which terminates in the nozzle 9 controllable through the valve 10.

The reaction drum 7 will ordinarily be submerged in the fluid in the outer shell or container. The sediment and heavy elements will settle to the bottom of the reaction drum thus preventing their collection on the bottom of the outer shell. The bottom of the outer shell being thus kept clean will not burn out and permit the discharge of its contents into the furnace which, if it happens, causes an explosion. The re-action drum 7 also relieves the shell 1 of part of the pressure to which the hydro-carbon is subjected by the pump 4, the pressure in said reaction drum being much higher than the pressure in the outer shell around said reaction drum. The lighter elements given off in the cracking process pass through the line 11 leading through the top of the shell to the conventional condenser as 12. The heavy oil may be drained from the shell 1 through the outlet pipe 13, controllable by a suitable valve 14. In case the reaction drum should burst the pressure in the outer shell may also be relieved through said pipe 13. At intervals the re-action drum 7 may be cleaned out by removing one end thereof for that purpose.

The hydro-carbon will be delivered into the re-action drum 7 at a high temperature and under high pressure. The valve 10 may be closed until the required pressure in the re-action drum 7 is obtained and then slightly opened so as to permit the continual discharge through the nozzle 9 but to maintain the pressure in the re-action drum 7. The hydro-carbon within the outer shell 1 will be of somewhat lower temperature and lower pressure than that of the hydro-carbon in the re-action drum 7 and the vapors evolved by the release of the hydro-carbon through the nozzle 9 from higher pressure to a lower pressure will operate to release the lighter elements or vapors from the fluid of higher pressure and the released vapors will be of very high temperature and will be distributed through the fluid in the outer shell and will keep such fluid in a state of constant turbulence resulting in a greater yield of lighter elements than would be otherwise obtainable.

It often happens that the coil 5 bursts, on account of the pressure within it, and the oil in said coil, in such event is drained into the furnace causing an explosion. To prevent this the surrounding housing 15 has been provided. This housing consists of an enlarged tube which surrounds the coil 5, in the furnace, and is spaced therefrom. The pipe 3, of which the coil 5 is formed, is fitted through the glands 16, 16, on opposite sides of the furnace, which close the ends of said housing. The upper turn of the housing coil carries a container 17, and a fused metal is poured into said container and fills the housing 15, and is kept in circulation by means of a pump 18 which is connected into a circulating line 19, which is connected at one end into the bottom turn of the housing coil, and at its other end into the container 17. This fused metal is thus kept in circulation about the coil 5 within the housing 15, and its chief purpose is to keep said housing from becoming too hot, and burned out and at the same time to permit the proper heating of the coil 5. The fused metal may be composed of lead and bismuth or a combination of other metals having a low melting point and a boiling point not lower than 700 degrees F.

In case the pressure in the coil 5 should cause the same to burst the hydrocarbon will be retained in the housing 15 and will be forced up into the container 17 through the fused metal and will pass out through the relief line 20, which is controlled by the relief valve 21, and conducted a sufficient distance from the still to prevent an explosion thereof.

The line 20 is provided with a trap 22 in which the fused metal carried by the discharging hydrocarbon will collect and it will drain back into the container 17 through the drain pipe 23.

Instead of the fused metal any other liquid bath for the coil 5 may be used which may be found to be practical.

While I have described only one form of the invention it is apparent that mechanical changes may be made in the embodiment thereof and equivalents substituted for the parts shown without departing from the principle of the invention and I hereby reserve the right to make such changes as may be found to be practical or expedient so long as the principle embodied within the appended claims is not departed from.

What I claim is:—

1. A still including an outer shell, an inlet line entering the shell, an enlarged reaction drum, within the shell into which said line is connected, a heating coil outside of the shell connected with said inlet line, a housing enclosing the turns of said coil and spaced therefrom forming a fluid circulating chamber about the turns of the heating coil, means for circulating a fluid through said chamber, said circulating means including an outlet line leading from said chamber, and a trap associated with the outlet line.

2. A still including an outer shell, an inlet line entering said shell, a furnace, said inlet line passing through said furnace, a housing surrounding the line within the furnace and forming a circulating chamber therearound, means for circulating a fluid through said chamber said circulating means including an outlet line leading out from said chamber and a trap incorporated into said outlet line.

3. A still including an outer shell, an inlet line entering said shell, a furnace, said inlet line passing through said furnace, a housing surrounding the line within the furnace and forming a circulating chamber therearound, means for circulating a fluid through said chamber, said circulating means including an outlet line leading from said chamber, and a trap incorporated into said outlet line.

4. In a still an outer shell, an inlet line for the outer shell, a housing around said line outside of the shell, forming a circulating chamber around the line, means for circulating a fluid through said chamber, said circulating means including a relief line leading from said chamber and a trap associated with the relief line.

5. A still including an outer shell, an inlet line entering said shell, an enlarged reaction drum in the shell into which the inlet line is connected, a furnace, said inlet line passing through said furnace, a housing surrounding the line within the furnace and forming a circulating chamber therearound, means for circulating a fused metal through said chamber, means for forcing fluid under pressure through said inlet line into said drum, said circulating means including an outlet line leading from said chamber, and a trap associated with the outlet line.

6. A still including an outer shell, a high pressure reaction drum located wholly within the shell, a furnace, an inlet line passing through said furnace, said line entering the shell and terminating in said drum, a valve in said line outside of the shell, an outlet leading from said drum into the shell, a valve operable from without the shell and controlling said outlet, means connected to the inlet line through which fluid in the drum may be maintained at a higher pressure than the fluid surrounding the drum within the shell, said valve controlling said outlet being effective to permit the escape of the high pressure fluid in the drum from said drum to distribute the same throughout the low pressure fluid in the shell and to maintain the fluid in the drum under a higher pressure than the fluid in the shell.

7. A still including an outer shell, a high pressure reaction drum located wholly within the shell, a furnace, an inlet line passing through said furnace, said line entering the shell and terminating in said drum, a valve in said line outside of the shell, an outlet leading from said drum into the shell, a valve located within the shell and operable from without the shell and controlling said outlet, means connected to the inlet line through which fluid in the drum may be maintained at a higher pressure than the fluid surrounding the drum within the shell, said valve controlling said outlet being effective to permit the escape of the high pressure fluid in the drum from said drum to distribute the same throughout the low pressure fluid in the shell and to maintain the fluid in the drum under a higher pressure than the fluid in the shell, and a vapor line for relieving the vapor from the shell.

In testimony whereof I have signed my name to the specification.

MAX F. DE BAJLIGETHY.